US012046194B2

(12) United States Patent
Hu et al.

(10) Patent No.: US 12,046,194 B2
(45) Date of Patent: Jul. 23, 2024

(54) DISPLAY SCREEN CONTROLLING METHOD AND APPARATUS

(71) Applicant: Yungu (Gu'an) Technology Co., Ltd., Hebei (CN)

(72) Inventors: Fengzhang Hu, Hebei (CN); Jinquan Zhang, Hebei (CN); Rusheng Liu, Hebei (CN); Junhui Lou, Hebei (CN)

(73) Assignee: Yungu (Gu'an) Technology Co., Ltd., Langfang (CN)

( * ) Notice: Subject to any disclaimer, the term of this patent is extended or adjusted under 35 U.S.C. 154(b) by 0 days.

(21) Appl. No.: 17/982,742

(22) Filed: Nov. 8, 2022

(65) Prior Publication Data

US 2023/0067867 A1 Mar. 2, 2023

Related U.S. Application Data

(63) Continuation of application No. PCT/CN2021/090850, filed on Apr. 29, 2021.

(30) Foreign Application Priority Data

Jul. 17, 2020 (CN) ......................... 202010693340.2

(51) Int. Cl.
*G09G 5/20* (2006.01)
*G09G 3/3225* (2016.01)

(52) U.S. Cl.
CPC ... *G09G 3/3225* (2013.01); *G09G 2320/0673* (2013.01)

(58) Field of Classification Search
CPC .... H10K 59/179; H10K 59/131; H10K 59/90; G09G 3/3225; G09G 3/3216; G09G 2320/0673

(Continued)

(56) References Cited

U.S. PATENT DOCUMENTS 11,067,853 B1 * 7/2021 Mei .................. G02F 1/133611
2012/0056961 A1 * 3/2012 Kinoshita .......... G06K 15/1247
347/118

(Continued)

FOREIGN PATENT DOCUMENTS

CN 101800029 A 8/2010
CN 103413540 A 11/2013

(Continued)

OTHER PUBLICATIONS

Office Action issued on Jun. 3, 2021, in connection with corresponding Chinese Patent Application No. 202010693340.2, 22 pages.

(Continued)

*Primary Examiner* — Jennifer T Nguyen
(74) *Attorney, Agent, or Firm* — Maier & Maier, PLLC

(57) ABSTRACT

A display screen controlling method and apparatus. The method includes: obtaining a first gamma value according to a turn-on instruction for an under-display device sent by an application processor; switching a gamma value of a first display region corresponding to the under-display device to the first gamma value, so as to turn off a plurality of light-emitting pixels of the first display region; obtaining a second gamma value according to a turn-off instruction for the under-display device sent by the application processor; and switching the first gamma value of the first display region to the second gamma value, so as to turn on the plurality of light-emitting pixels of the first display region.

9 Claims, 7 Drawing Sheets

(58) Field of Classification Search
USPC ............................................................ 345/55
See application file for complete search history.

(56) References Cited

U.S. PATENT DOCUMENTS

| | | | | |
|---|---|---|---|---|
| 2021/0350735 | A1* | 11/2021 | Kim | G09G 3/3611 |
| 2022/0320183 | A1* | 10/2022 | Bao | H10K 59/38 |
| 2023/0189600 | A1* | 6/2023 | Fan | H10K 59/88 345/690 |

FOREIGN PATENT DOCUMENTS

| | | | |
|---|---|---|---|
| CN | 104885002 | A | 9/2015 |
| CN | 107808651 | A | 3/2018 |
| CN | 108366186 | A | 8/2018 |
| CN | 106205468 | B | 6/2019 |
| CN | 109979386 | A | 7/2019 |
| CN | 110460700 | A | 11/2019 |
| CN | 111309135 | A | 6/2020 |
| CN | 111383597 | A | 7/2020 |
| CN | 111833809 | A | 10/2020 |

OTHER PUBLICATIONS

International Search Report dated Jul. 14, 2021 for corresponding PCT Application No. PCT/CN2021/090850, 12 pages.

Second Office Action issued on Feb. 3, 2022, in connection with corresponding Chinese Patent Application No. 202010693340.2, 22 pages.

Notice of Allowance issued on May 7, 2022, in connection with corresponding Chinese Patent Application No. 202010693340.2, 5 pages.

* cited by examiner

DISPLAY SCREEN CONTROLLING METHOD AND APPARATUS

CROSS-REFERENCE TO RELATED APPLICATION

The present application is a continuation of International Application No. PCT/CN2021/090850, filed on Apr. 29, 2021, which claims priority to Chinese Patent Application No. 202010693340.2, filed on Jul. 17, 2020 with the China National Intellectual Property Administration and entitled "DISPLAY SCREEN CONTROLLING METHOD AND APPARATUS", both of the applications are hereby incorporated by reference in their entireties.

TECHNICAL FIELD

Embodiments of the present disclosure relates to the technical field of OLED display screen, and in particular, to a display screen controlling method and apparatus.

BACKGROUND

Unlike conventional Liquid Crystal screens, since an organic light-emitting diode (Organic Light-Emitting Diode, OLED) display screen displays images using organic light-emitting diodes that generate light, an OLED display screen may not include a light source (e.g., a backlight unit). Therefore, OLED display screens can be slim and light-weight compared to conventional Liquid Crystal display screens. In addition, OLED display screens has the advantages of low power consumption, improved brightness, and increased response speed as compared to liquid crystal display screens. Therefore, OLED display screens are widely used as display screens in various electronic apparatus.

In related art, taking an OLED display screen used as a display screen of a mobile phone as an example, the OLED display screen includes an under-display device, such as an under-display camera (Under Display Camera, UDC) or an under-display fingerprint recognizing module, etc., taking UDC as an example, a display screen region above a location where the camera is located needs to be turned off when the camera is operating, so as to achieve the transparent effect of this region and enable the camera to operate normally, and this region needs to be turned on again after the camera shooting is finished. The turn-on or turn-off of the above-mentioned display screen region is usually realized by writing different data.

However, the above-mentioned method in which a certain display screen region is turned on or turned off by writing different data makes operations cumbersome and cannot meet the needs of practical applications.

SUMMARY

In order to solve the problems existing in the prior art, the present application provides a display screen controlling method and apparatus.

In order to achieve the above purpose, the embodiments of the present disclosure provide the following technical solutions.

In a first aspect, an embodiment of the present application provides a display screen controlling method, the method can be executed by a drive apparatus, the method includes the following steps: first, obtaining a first gamma value according to a turn-on instruction for an under-display device sent by an application processor, where the turn-on instruction for the under-display device is sent when the application processor monitors that the under-display device is turned on. Furthermore, the drive apparatus switches a gamma value of a first display region corresponding to the under-display device to the first gamma value, so as to turn off a plurality of light-emitting pixels of the first display region, so as to realize the transparent effect of this region, and enable the under-display device to operate normally. Then, obtaining a second gamma value according to a turn-off instruction for the under-display device sent by the application processor, where the turn-off instruction for the under-display device is sent when the application processor monitors that the under-display device is turned off, and the second gamma value is the different from the first gamma value. Furthermore, the drive apparatus switches the first gamma value of the first display region to the second gamma value, so as to turn on the plurality of light-emitting pixels of the first display region, thereby restoring the normal operation of the first display region.

Herein, in the embodiment of the present application, the turn-on or turn-off of the display screen region is realized by simply adjusting a Gamma parameter of the first display region corresponding to the under-display device, thus enabling the under-display device to operate normally, thereby solving the problem of cumbersome operations occurred when turning on or turning off a certain display screen region by writing different data in the existing art.

In a possible implementation, obtaining a first gamma value according to a turn-on instruction for an under-display device sent by an application processor, includes:

obtaining a pre-stored corresponding relationship between an instruction for the under-display device and a gamma value; and obtaining the first gamma value corresponding to a turn-on instruction for the under-display device according to the corresponding relationship.

Where the above corresponding relationship may be determined according to actual situations, for example, the first gamma value corresponding to the turn-on instruction for the under-display device, and the turn-off instruction for the under-display device corresponds to the second gamma value, which is not particularly limited in the embodiment of the present application.

Exemplarily, where the obtaining a second gamma value according to a turn-off instruction for the under-display device sent by the application processor includes:

obtaining the second gamma value corresponding to the turn-off instruction for the under-display device, according to the corresponding relationship.

In the embodiment of the present application, through the pre-stored corresponding relationship between an instruction for the under-display device and a gamma value, accordingly, when the under-display device is turned on or off, different gamma values are determined based on the corresponding relationship, so that the gamma value of the first display region corresponding to the under-display device is adjusted based on the determined gamma value, so that when the under-display device is turned on, the transparent effect of the region is realized, the under-display device operates normally, the operation is simple, thus meeting the practical application needs.

In a possible implementation, where the switching a gamma value of a first display region corresponding to the under-display device to the first gamma value includes:

detecting whether the gamma value of the first display region is the same as the first gamma value;

if the gamma value of the first display region is different from the first gamma value, switching the gamma value of the first display region to the first gamma value.

Here, before switching the gamma value of the first display region corresponding to the under-display device to the first gamma value, the drive apparatus firstly detects whether the two gamma values are the same, and performs switching if they are different, otherwise, the drive apparatus does not perform the switching, thus avoiding some unnecessary operation steps and rendering it suitable for applications.

In a possible implementation, the first gamma value is determined according to a voltage required to turn off the plurality of light-emitting pixels of the first display region. The second gamma value is determined according to a voltage required to turn on the plurality of light-emitting pixels of the first display region.

In the embodiment of the present application, the voltages required to turn off or turn on the plurality of light-emitting pixels of the first display region are different, therefore, the first display region has different corresponding gamma values under different operating states of the under-display device. For example, when the under-display device is turned on, the first display region corresponds to the gamma value determined according to the voltage required to turn off the plurality of light-emitting pixels of the first display region, that is, the first gamma value; when the under-display device is turned off, the first display region corresponds to the gamma value determined according to the voltage required to turn on the plurality of light-emitting pixels of the first display region, that is, the second gamma value.

In a possible implementation, the under-display device includes a UDC, an under-display fingerprint identifying module, and the like, which may be determined according to actual situations, and is not particularly limited in this embodiment of the present application.

In a second aspect, the embodiment of the present application provides another display screen controlling method, the method can be executed by an application processor, and the method includes the following steps: when an application processor monitors that an under-display device is turned on, the application processor sends a turn-on instruction for an under-display device to a drive apparatus, the turn-on instruction for the under-display device is used to instruct a drive apparatus to obtain a first gamma value and switch a gamma value of a first display region corresponding to the under-display device to the first gamma value, so as to turn off a plurality of light-emitting pixels of the first display region; when the application processor monitors that the under-display device is turned off, the application processor sends a turn-off instruction for the under-display device to the drive apparatus, and the turn-off instruction for the under-display device is used to instruct the drive apparatus to obtain a second gamma value and switch the first gamma value of the first display region to the second gamma value, so as to turn on the plurality of light-emitting pixels of the first display region.

Here, in the embodiment of the present application, the state of the under-display device is monitored by the application processor, when the under-display device is turned on, the turn-on instruction for the under-display device is sent to the drive apparatus, and when the under-display device is turned off, the turn-off instruction for the under-display device is sent to the drive apparatus, so that the Gamma parameter of the first display region corresponding to the under-display device is adjusted by the drive apparatus, and the turn-on or turn-off of the display screen region is realized, enabling the under-display device to operate normally, thereby solving the problem of cumbersome operations occurred when turning on or turning off a certain display screen region currently by writing different data in the existing art.

In a third aspect, an embodiment of the present application provides a display screen controlling apparatus, including:

a first obtaining module, configured to obtain a first gamma value according to a turn-on instruction for an under-display device sent by an application processor;

a first switching module, configured to switch a gamma value of a first display region corresponding to the under-display device to the first gamma value, so as to turn off a plurality of light-emitting pixels of the first display region;

a second obtaining module, configured to obtain a second gamma value according to a turn-off instruction for the under-display device sent by the application processor; and a second switching module, configured to switch the first gamma value of the first display region to the second gamma value, so as to turn on the plurality of light-emitting pixels of the first display region.

In a possible implementation, the first obtaining module is specifically configured to:

obtain a pre-stored corresponding relationship between an instruction for the under-display device and a gamma value; and obtain the first gamma value corresponding to the turn-on instruction for the under-display device according to the corresponding relationship.

In a possible implementation, the first switching module is specifically configured to:

detect whether the gamma value of the first display region is the same as the first gamma value; and if the gamma value of the first display region is different from the first gamma value, switch the gamma value of the first display region to the first gamma value.

In a possible implementation, the first gamma value is determined according to a voltage required to turn off the plurality of light-emitting pixels of the first display region, and the second gamma value is determined according to a voltage required to turn on the plurality of light-emitting pixels of the first display region.

In a fourth aspect, an embodiment of the present application provides another display screen controlling apparatus, including:

a first sending module, configured to send a turn-on instruction for an under-display device to a drive apparatus, when the display screen controlling apparatus monitors that the under-display device is turned on, where the turn-on instruction for the under-display device is used to instruct the drive apparatus to obtain a first gamma value and switch a gamma value of a first display region corresponding to the under-display device to the first gamma value, so as to turn off a plurality of light-emitting pixels of the first display region; and a second sending module, configured to send a turn-off instruction for the under-display device to the drive apparatus when the display screen controlling apparatus monitors that the under-display device is turned off, where the turn-off instruction for the under-display device is used to instruct the drive apparatus to obtain a second gamma value and switch the first gamma value of the first display region to the second gamma value, so as to turn on the plurality of light-emitting pixels of the first display region.

In a fifth aspect, an embodiment of the present application provides yet another display screen controlling device, including:

a memory, a processor and computer instructions stored in the memory and executable on the processor, when executing the computer instructions, the processor implements the method as provided in the first aspect or various possible designs of the first aspect.

In a sixth aspect, an embodiment of the present application provides still another display screen controlling device, including:

a memory, a processor and computer instructions stored in the memory and executable on the processor, when executing the computer instructions, the processor implements the method as provided in the second aspect or various possible designs of the second aspect.

In a seventh aspect, an embodiment of the present application provides a computer-readable storage medium, where computer instructions are stored in the computer-readable storage medium, and when executing the computer instructions, a processor implements the method as provided in the first aspect or various possible designs of the first aspect.

In an eighth aspect, an embodiment of the present application provides another computer-readable storage medium, where computer instruction are stored in the computer-readable storage medium, and when executing the computer instructions, a processor implements the method as provided in the second aspect or various possible designs of the second aspect.

The embodiment of the present application provides a display screen controlling method and apparatus, in the method, a drive apparatus receives a turn-on instruction for an under-display device or a turn-off instruction for the under-display device sent by an application processor, and then adjusts a Gamma parameter of a first display region corresponding to the under-display device according to these instructions. When the under-display device is turned on, a plurality of light-emitting pixels of the region are turned off, so as to realize the transparent effect of the region, thus enabling the under-display device to operate normally. When the under-display device is turned off, the plurality of light-emitting pixels of the region are turned on, so as to resume the normal operation of the region. According to the present application, the problem of cumbersome operations occurred when turning on or turning off a certain display screen region currently by writing different data in the existing art is solved.

DETAILED DESCRIPTION OF THE EMBODIMENTS

The technical solutions of the embodiment of the present application will be clearly and completely described below with reference to the drawings in the embodiment of the present application, obviously, the described embodiments are only a part of the embodiments of the present application, but not all of the embodiments. Based on the embodiments in the present application, all other embodiment obtained by those of ordinary skill in the art without paying creative efforts will fall within the protection scope of the present application.

Figure 1:
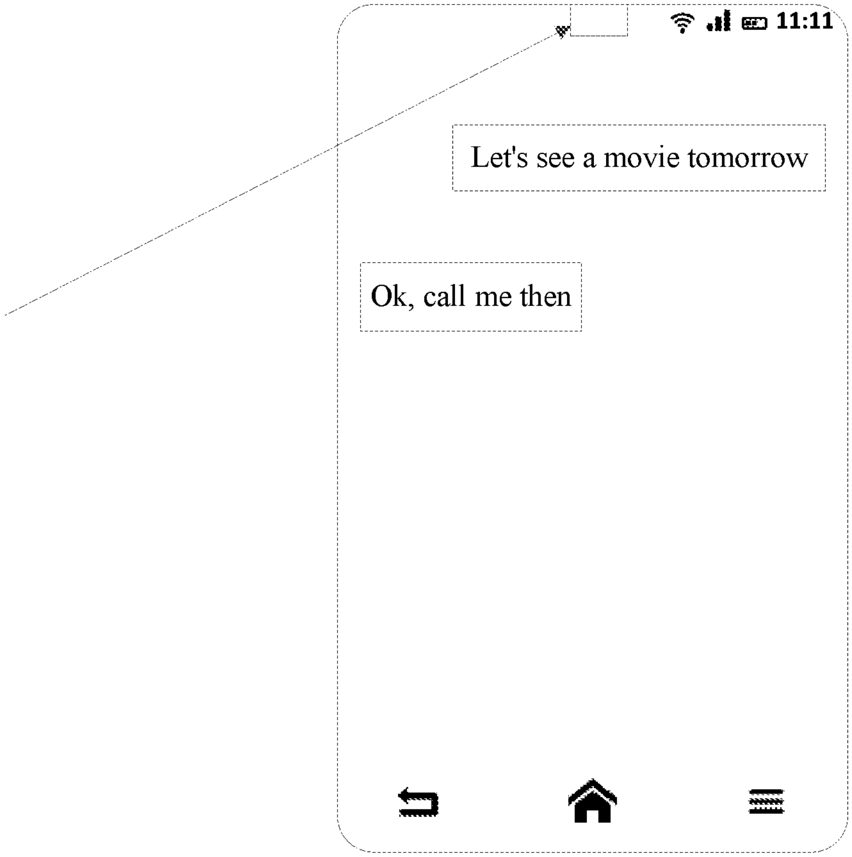
FIG. 1 is a schematic diagram of a first display region corresponding to an under-display device, provided by an embodiment of the present application.

OLED display screens are widely used as display screens in various electronic apparatus. In the related art, taking an OLED display screen used as a display screen of a mobile phone as an example, an under-display device includes a UDC or an under-display fingerprint recognizing module, etc., taking the UDC as an example, as shown in FIG. 1, in a user chat interface, a display screen region corresponding to the UDC is the region indicated by the arrow in the figure, the display screen region above the location where the camera is located needs to be turned off when the camera is operating, so as to achieve the transparent effect of this region and enable the camera to operate normally, and this region needs to be turned on again after the camera shooting is finished.

In the prior art, the turn-on or turn-off of the above-mentioned display screen region is usually realized by writing different data. Specifically, whether the display of the designated region is implemented or not is realized by writing different display data, when the display of the designated region is resumed, display content in other regions at the moment should be taken into consideration to avoid abnormal display, the operation is cumbersome, which thus cannot meet needs of practical applications.

Herein, the embodiment of the present application proposes a display screen controlling method, through which the turn-on or turn-off of the display screen region can be realized by adjusting a Gamma parameter of a first display region corresponding to an under-display device, thus enabling the under-display device to operate normally, thereby solving the problem of cumbersome operations occurred when turning on or turning off a certain display screen region currently by writing different data in the existing art.

The display screen controlling method and apparatus provided by the embodiment of the present application can be applied for controlling display screens of terminals; further, the above-mentioned display screen controlling method and apparatus can be used in control of the display screens of digital video cameras, DVD players, PDAs, notebook computers, car audio and televisions etc., which is not specifically limited in the embodiments of the present application.

Figure 2:
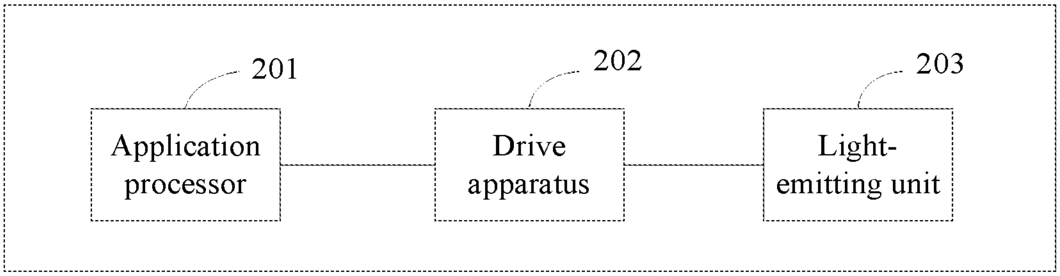
FIG. 2 is a schematic diagram of an architecture of a display screen control system provided by an embodiment of the present application.

In an implementation, the display screen controlling method and apparatus provided by the embodiments of the present application may be applied to an application scenario shown in FIG. 2. FIG. 2 simply describes a possible application scenario of the display screen controlling method provided by an embodiment of the present application, and the application scenario of the display screen controlling method provided by the embodiment of the present application is not limited to the application scenario shown in FIG. 2.

FIG. 2 is a schematic diagram of an architecture of a display screen control system. In FIG. 2, an example is taken where a display screen of a mobile phone is controlled. The above architecture includes an application processor 201, a drive apparatus 202 and a light-emitting unit 203.

It can be understood that the architecture illustrated in the embodiment of the present application does not constitute a specific limitation on the control architecture of the display screen. In some other feasible embodiments of the present application, the above architecture may include more or less components than those shown in the figure, or some components may be combined, or some components may be disassembled, or may include different component arrangements, which can be determined according to actual application scenarios, and is not limited herein. The components shown in FIG. 2 may be implemented in the form of hardware, software, or a combination of software and hardware.

In a specific implementation process, the application processor 201 monitors a state of the under-display device in the mobile phone, for example, the application processor 201 monitors whether the under-display device is turned on or off, and the application processor 201 can send a turn-on instruction for the under-display device to the drive apparatus when the application processor monitors that the under-display device is turned on, or, when the application processor monitors that the under-display device is turned off, it sends a turn-off instruction for the under-display device to the drive apparatus. It should be noted that the turn-on instruction for the under-display device and the turn-off instruction for the under-display device are both instructions for the under-display device.

The drive apparatus 202 can receive the above-mentioned turn-on instruction for the under-display device or turn-off instruction for the under-display device sent by the above-mentioned application processor 201, and adjust a Gamma parameter of a display screen region corresponding to the under-display device according to the received instruction, thereby realizing the turn-on or turn-off of the display screen region, enabling the under-display device to operate normally. Where the drive apparatus may be provided with a display panel drive integrated circuit (Display Panel Drive Integrated Circuit, DDIC), and then perform the above operations through the DDIC, which is not particularly limited in the embodiments of the present application.

The light-emitting unit 203 can be configured to display the above-mentioned different Gamma parameters and the like.

It should be understood that the system architecture and business scenarios described in the embodiments of the present application are for the purpose of illustrating the technical solutions of the embodiments of the present application more clearly, and do not constitute limitations on the technical solutions provided by the embodiments of the present application. Those skilled in the art would know that with the evolution of the system architecture and the emergence of new business scenarios, the technical solutions provided in the embodiments of the present application are also applicable to similar technical problems.

The technical solutions of the present application are described below by taking several embodiments as examples, and the same or similar concepts or processes may not be repeated in some embodiments.

Figure 3:
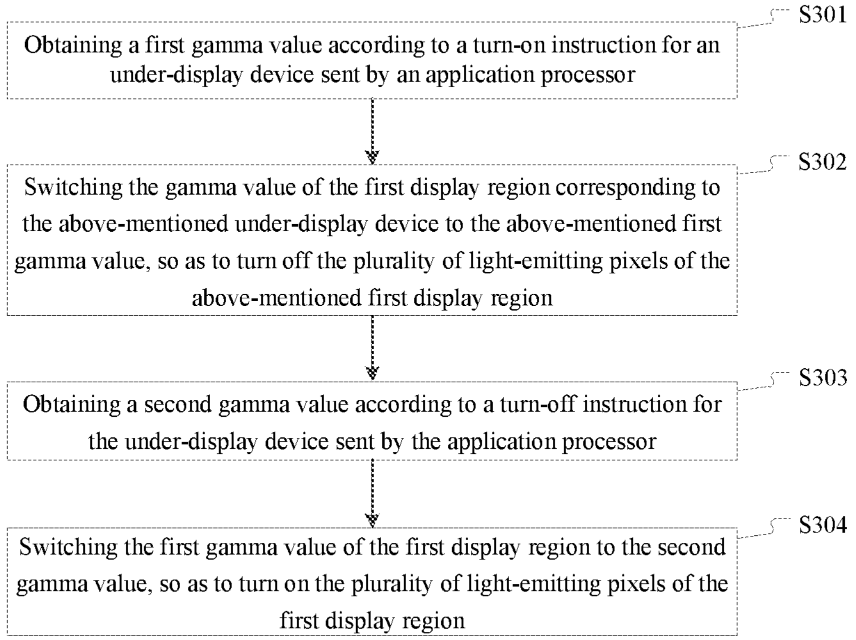
FIG. 3 is a schematic flowchart of a display screen controlling method provided by an embodiment of the present application.

FIG. 3 is a schematic flowchart of a display screen controlling method provided by an embodiment of the present application, the execution body of this embodiment may be the drive apparatus 202 in FIG. 2, and the specific execution body may be determined according to an actual application scenario. As shown in FIG. 3, on the basis of the application scenario shown in FIG. 2, the display screen controlling method provided by the embodiment of the present application includes the following steps:

S301: obtaining a first gamma value according to a turn-on instruction for an under-display device sent by an application processor.

Here, the application processor monitors a state of the under-display device in the mobile phone, and can send the turn-on instruction for the under-display device to the drive apparatus when the application processor detects that the under-display device is turned on, that is, the above-mentioned turn-on instruction for the under-display device can be sent when the application processor monitors that the under-display device is turned on.

The above-mentioned under-display device includes a UDC, an under-display fingerprint identifying module, and the like, which may be determined according to actual situations, and is not particularly limited in this embodiment of the present application.

Taking UDC as an example, the above-mentioned turn-on instruction for the under-display device may include a camera shooting start instruction or a photographing start instruction, etc., after receiving the above instruction sent by the application processor, the drive apparatus adjusts a Gamma parameter of a display screen region corresponding to the UDC according to the above instruction to realize the turn-on of the display screen region, thereby enabling the UDC to operate normally.

In addition, the above-mentioned first gamma value corresponds to the above-mentioned turn-on instruction for the under-display device, that is, different instructions for the under-display device correspond to different gamma values, and the above-mentioned first gamma value is the gamma value corresponding to the above-mentioned turn-on instruction for the under-display device.

In a possible implementation, the above-mentioned first gamma value is determined according to a voltage required to turn off a plurality of light-emitting pixels of the display screen region corresponding to the under-display device, and may be set according to actual situations, which is not particularly limited in this embodiment of the present application.

S302: switching the gamma value of the first display region corresponding to the above-mentioned under-display device to the above-mentioned first gamma value, so as to turn off the plurality of light-emitting pixels of the above-mentioned first display region.

Here, the above-mentioned first display region can be understood as an upper display screen region corresponding to the above-mentioned under-display device, exemplarily, as shown in FIG. 1, the under-display device is a UDC, and the first display screen region corresponding to the UDC is the region indicated by the arrow in the figure.

In the embodiment of the present application, the drive apparatus adjusts the gamma value of the first display region corresponding to the under-display device based on the above-mentioned turn-on instruction for the under-display device, so as to turn off the plurality of light-emitting pixels of the above-mentioned first display region, so as to realize the transparent effect of this region, and enable the under-display device to operate normally.

S303: obtaining a second gamma value according to a turn-off instruction for the under-display device sent by the application processor.

Here, the application processor may send a turn-off instruction for the under-display device to the drive apparatus when detecting that the under-display device is turned off, that is, the turn-off instruction for the under-display device may be sent when the above-mentioned application processor detects that the under-display device is turned off.

Taking the UDC as an example, the above-mentioned turn-off instruction for the under-display device may include a camera shooting end instruction or a photographing end instruction, etc., the drive apparatus, after receiving the turn-off instruction for the under-display device sent by the application processor, adjusts the Gamma parameter of the first display region according to the instruction, so as to resume the normal operation of the first display region.

In addition, the above-mentioned second gamma value is different from the above-mentioned first gamma value.

The second gamma value is a gamma value corresponding to the turn-off instruction for the under-display device.

In a possible implementation, the above-mentioned second gamma value is determined according to a voltage required to turn on the plurality of light-emitting pixels of the above-mentioned first display region, and may be set according to actual situations, which is not particularly limited in this embodiment of the present application.

S304: switching the first gamma value of the first display region to the second gamma value, so as to turn on the plurality of light-emitting pixels of the first display region.

Where the drive apparatus obtains the second gamma value after receiving the turn-off instruction for the under-display device sent by the application processor, and then switches the first gamma value of the first display region corresponding to the under-display device to the second gamma value, the plurality of light-emitting pixels of the first display region is turned on, so as to resume the normal operation of the first display region.

Here, taking the display screen of the mobile phone as an example, a region in the display screen corresponding to the under-display device of the mobile phone may be referred to as the first display region, and the remaining region in the display screen except the region corresponding to the under-display device may be referred to as a second display screen region. The gamma value of the first display region is adjustable. That is, the drive apparatus obtains the first gamma value when receiving the turn-on instruction for the under-display device sent by the application processor, and then switches the gamma value of the first display region corresponding to the under-display device to the first gamma value, and the plurality of light-emitting pixels of the first display region are turned off; when receiving the turn-off instruction for the under-display device sent by the application processor, the drive apparatus obtains the second gamma value, and then switches the first gamma value corresponding to the under-display device to the second gamma value, and the first display region of a plurality of light-emitting pixels are turned on.

Where the second gamma value may be the gamma value of the second display screen region. That is, when the under-display device is turned off, the drive apparatus adjusts the first gamma value corresponding to the under-display device to the gamma value of the second display screen region, so as to resume the normal operation of the display screen region corresponding to the under-display device.

In the embodiment of the present application, the drive apparatus may also receive a gamma value adjustment instruction, and then adjusts a gamma value of a certain region of the display screen according to the gamma value adjustment instruction, where the specific region may be determined according to actual situations, for example, the remaining region except the first display region corresponding to the above-mentioned under-display device in the display screen. The above gamma value adjustment instruction can carry the adjusted gamma value.

In the embodiment of the present application, a turn-on instruction for an under-display device or a turn-off instruction for the under-display device sent by an application processor is received through the drive apparatus, and then the Gamma parameter of the first display region corresponding to the under-display device is adjusted according to these instructions. When the under-display device is turned on, the plurality of light-emitting pixels of the above-mentioned region are turned off, so as to realize the transparent effect of the above-mentioned region, enabling the under-display device to operate normally. When the under-display device is turned off, the plurality of light-emitting pixels of the above-mentioned region are turned on, so as to resume the normal operation of the above-mentioned region. According to the embodiment of the present application, the problem of cumbersome operations occurred when turning on or turning off a certain display screen region currently by writing different data in the existing art is solved.

Figure 4:
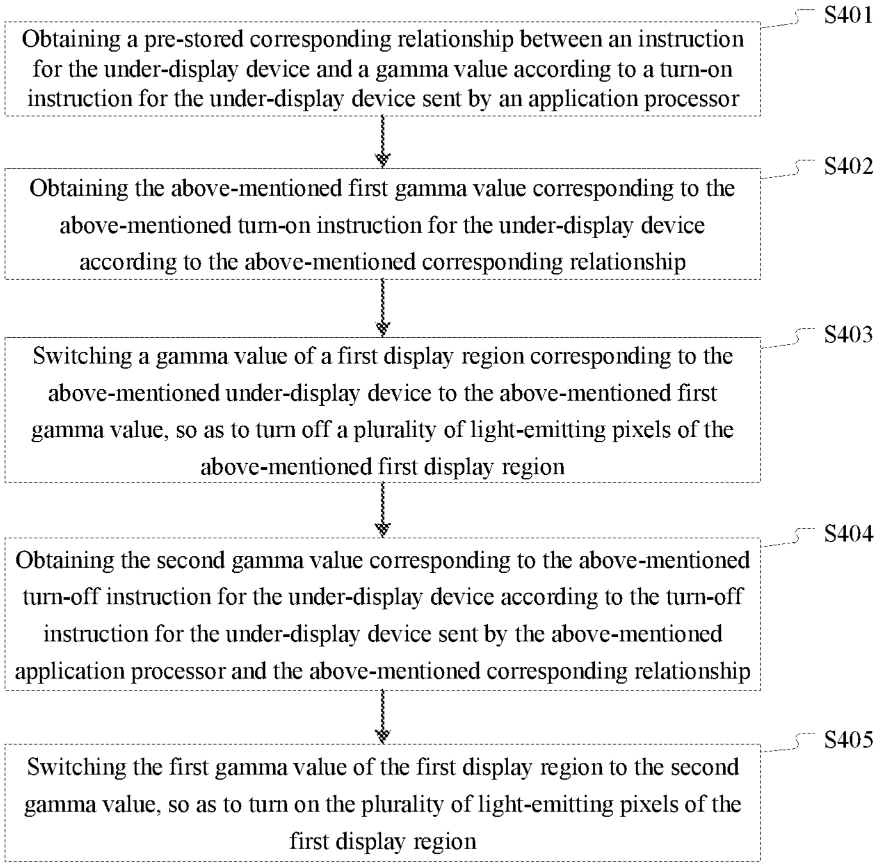
FIG. 4 is a schematic flowchart of another display screen controlling method provided by an embodiment of the application, where the method includes accurately and quickly obtaining gamma values corresponding to different instructions for the under-display device based on a corresponding relationship.

In addition, in the embodiment of the present application, on the basis of turning off the plurality of light-emitting pixels of the first display region corresponding to the under-display device or turning on the plurality of light-emitting pixels of the first display region corresponding to the under-display device by the drive apparatus according to the turn-on instruction for the under-display device or the turn-off instruction for the under-display device sent by the application processor, considering to obtain different gamma values according to the above-mentioned turn-on instruction for the under-display device or the turn-off instruction for the under-display device, and then turning off the plurality of light-emitting pixels of the first display region corresponding to the under-display device or turning on the plurality of light-emitting pixels of the first display region corresponding to the under-display device, based the gamma values. Where the drive apparatus, when obtaining the above-mentioned different gamma values, that is, when obtaining the above-mentioned first gamma value or the second gamma value, takes a pre-stored corresponding relationship between an instruction for the under-display device and a gamma value into account, so as to accurately and quickly obtain gamma values corresponding to different instructions for the under-display device based on the corresponding relationship, thereby meeting application needs. FIG. 4 is a schematic flowchart of another display screen controlling method proposed by an embodiment of the present application. As shown in FIG. 4, the method includes:

S401: obtaining a pre-stored corresponding relationship between an instruction for the under-display device and a gamma value according to a turn-on instruction for the under-display device sent by an application processor.

Where the above corresponding relationship may be determined according to actual situations, for example, the turn-on instruction for the under-display device corresponds to the above-mentioned first gamma value, and a turn-off instruction for the under-display device corresponds to the above-mentioned second gamma value, which is not particularly limited in this embodiment of the present application.

S402: obtaining the above-mentioned first gamma value corresponding to the above-mentioned turn-on instruction for the under-display device according to the above-mentioned corresponding relationship.

S403: switching a gamma value of a first display region corresponding to the above-mentioned under-display device to the above-mentioned first gamma value, so as to turn off a plurality of light-emitting pixels of the above-mentioned first display region.

The implementation of step S403 is the same as that of the above-mentioned step S302, which will not be repeated here.

S404: obtaining the second gamma value corresponding to the above-mentioned turn-off instruction for the under-display device according to the turn-off instruction for the under-display device sent by the above-mentioned application processor and the above-mentioned corresponding relationship.

S405: switching the first gamma value of the first display region to the second gamma value, so as to turn on the plurality of light-emitting pixels of the first display region.

The implementation of step S405 is the same as that of the above-mentioned step S304, which will not be repeated here.

In addition, in the embodiment of the present application, the drive apparatus may also receive a corresponding relationship adjustment instruction, and then adjust, based on the instruction, the pre-stored corresponding relationship between an instruction for the under-display device and a gamma value, thereby to meeting various application needs.

In the embodiment of the present application, through the pre-stored corresponding relationship between an instruction for the under-display device and a gamma value, in turn, when the under-display device is turned on or off, different gamma values are determined based on the above-mentioned corresponding relationship, in this way, the gamma value of the first display region corresponding to the under-display device is adjusted based on the determined gamma value, so that when the under-display device is turned on, the transparent effect of the region is realized, the under-display device operates normally, the operation is simple, thus meeting practical application needs. In addition, in the embodiment of the present application, the turn-on or turn-off of the display screen region is realized by simply using the drive apparatus to adjust the Gamma parameter of the first display region corresponding to the under-display device, thus enabling the under-display device to operate normally, thereby solving the problem of cumbersome operations occurred when turning on or turning off a certain display screen region currently by writing different data in the existing art.

Figure 5:
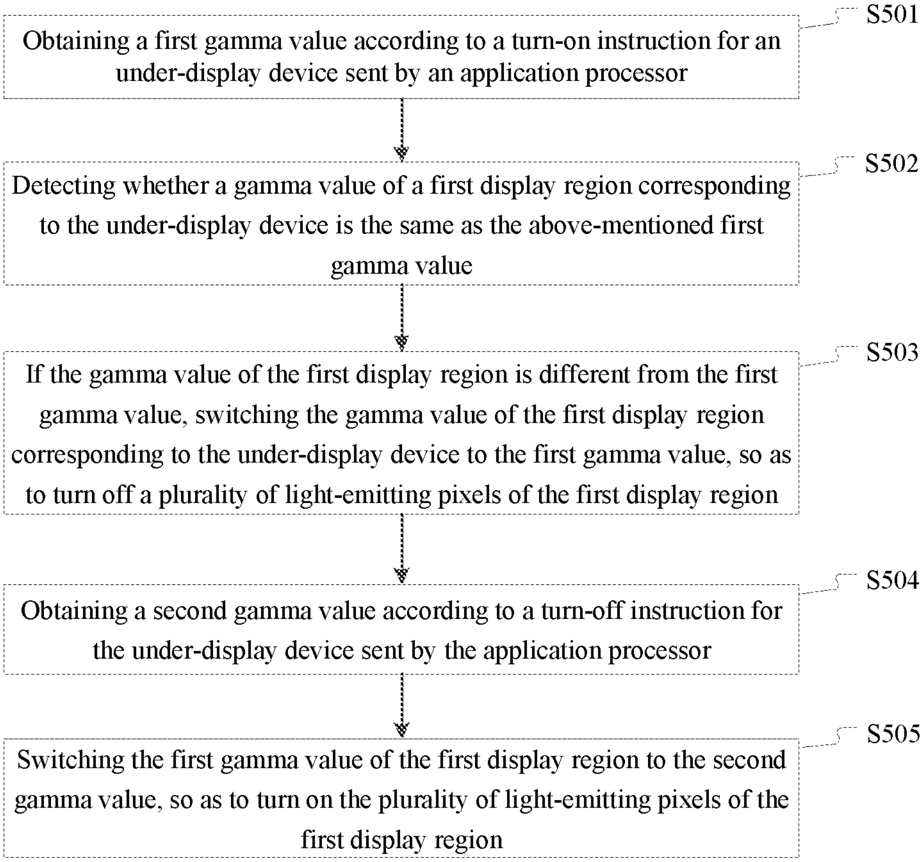
FIG. 5 is a schematic flowchart of still another display screen controlling method provided by an embodiment of the present application, where the method includes first detecting whether a gamma value of a first display region is the same as a first gamma value, and if they are different, performing subsequent manipulation of switching of gamma values.

In addition, in the embodiment of the present application, when the gamma value of the first display region corresponding to the under-display device is switched to the above-mentioned first gamma value, it is first detected whether the gamma value of the above-mentioned first display region is the same as the above-mentioned first gamma value, if they are different, the subsequent gamma value switching operation is performed, thereby avoiding unnecessary waste of resources. FIG. 5 is a schematic flowchart of still another display screen controlling method proposed by an embodiment of the present application. As shown in FIG. 5, the method includes:

S501: obtaining a first gamma value according to a turn-on instruction for an under-display device sent by an application processor.

The implementation of step S501 is the same as that of the above-mentioned step S301, which will not be repeated here.

S502: detecting whether a gamma value of a first display region corresponding to the under-display device is the same as the above-mentioned first gamma value.

S503: if the gamma value of the first display region is different from the first gamma value, switching the gamma value of the first display region corresponding to the under-display device to the first gamma value, so as to turn off a plurality of light-emitting pixels of the first display region.

Here, the drive apparatus may compare whether the current gamma value of the first display region corresponding to the under-display device is the same as the above-mentioned first gamma value, and if they are different, the drive apparatus switches the gamma value of the above-mentioned first display region to the above-mentioned first gamma value, otherwise, the switching will not be performed, thus avoiding some unnecessary operation steps, and making it suitable for application.

S504: obtaining a second gamma value according to a turn-off instruction for the under-display device sent by the application processor.

S505: switching the first gamma value of the first display region to the second gamma value to turn on the plurality of light-emitting pixels of the first display region.

The implementation of step S504-S505 is the same as that of the above-mentioned step S303-S304, which will not be repeated here.

In this embodiment of the present application, before the gamma value of the first display region corresponding to the under-display device is switched to the first gamma value, it is detected whether the above two gamma values are the same, when it is detected that they are different, the gamma value switching is performed, otherwise, the switching is not performed, in this way, unnecessary operation steps are simplified and application needs are met. In addition, in the embodiment of the present application, the turn-on or turn-off of the display screen region is realized by simply using the drive apparatus to adjust the Gamma parameter of the first display region corresponding to the under-display device, thus enabling the under-display device to operate normally, thereby solving the problem of cumbersome operations occurred when turning on or turning off a certain display screen region currently by writing different data in the existing art.

The display screen controlling method according to the embodiments of the present application has been described in detail from the side of the drive apparatus 202 with reference to FIGS. 3 to 5, hereunder, another display screen controlling method provided according to an embodiment of the present application will be described in detail from the side of the application processor 201 with reference to FIG. 6. It should be understood that some concepts, characteristics, etc. described on the side of the application processor 201 correspond to those described on the side of the drive apparatus 202, and repeated descriptions are appropriately omitted for brevity.

Figure 6:
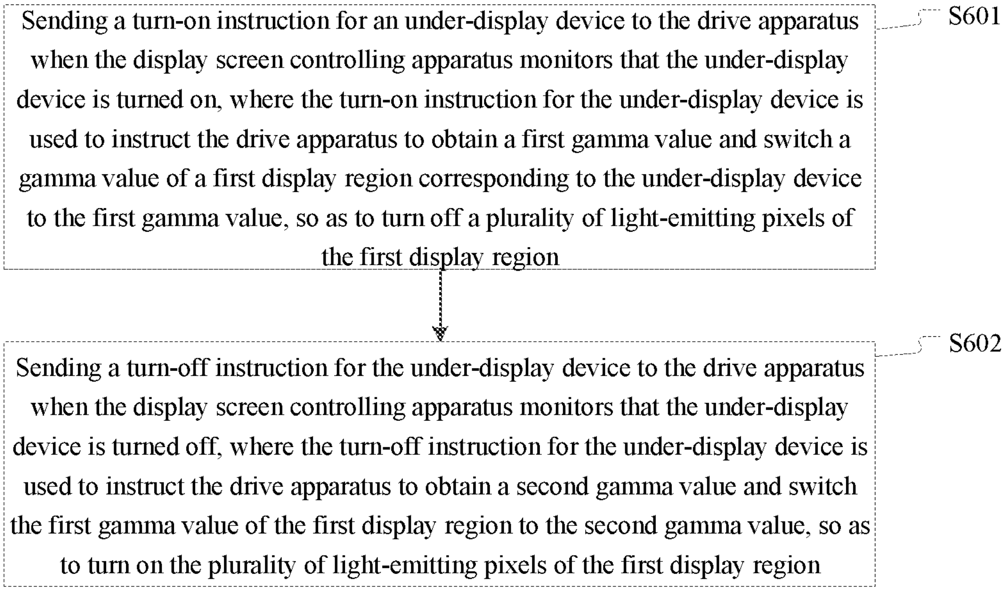
FIG. 6 is a schematic flowchart of still another display screen controlling method provided by an embodiment of the present application.

FIG. 6 provides a schematic flowchart of another display screen controlling method provided by an embodiment of the present application, the execution body of this embodiment may be the application processor 201 in the embodiment shown in FIG. 2, as shown in FIG. 6, the method may include:

S601: sending a turn-on instruction for an under-display device to the drive apparatus when the display screen controlling apparatus monitors that the under-display device is turned on, where the turn-on instruction for the under-display device is used to instruct the drive apparatus to obtain a first gamma value and switch a gamma value of a first display region corresponding to the under-display device to the first gamma value, so as to turn off a plurality of light-emitting pixels of the first display region; and

S602: sending a turn-off instruction for the under-display device to the drive apparatus when the display screen controlling apparatus monitors that the under-display device is turned off, where the turn-off instruction for the under-display device is used to instruct the drive apparatus to obtain a second gamma value and switch the first gamma value of the first display region to the second gamma value, so as to turn on the plurality of light-emitting pixels of the first display region.

In this embodiment of the present application, the state of the under-display device is monitored by the application processor, when the under-display device is turned on, the turn-on instruction for the under-display device is sent to the drive apparatus, and when the under-display device is turned off, the turn-off instruction for the under-display device is sent to the drive apparatus, so that the Gamma parameter of the first display region corresponding to the under-display device is adjusted by the drive apparatus, and the turn-on or turn-off of the display screen region is realized, thus enabling the under-display device to operate normally, thereby solving the problem of cumbersome operations occurred when turning on or turning off a certain display screen region currently by writing different data in the existing art.

Figure 7:
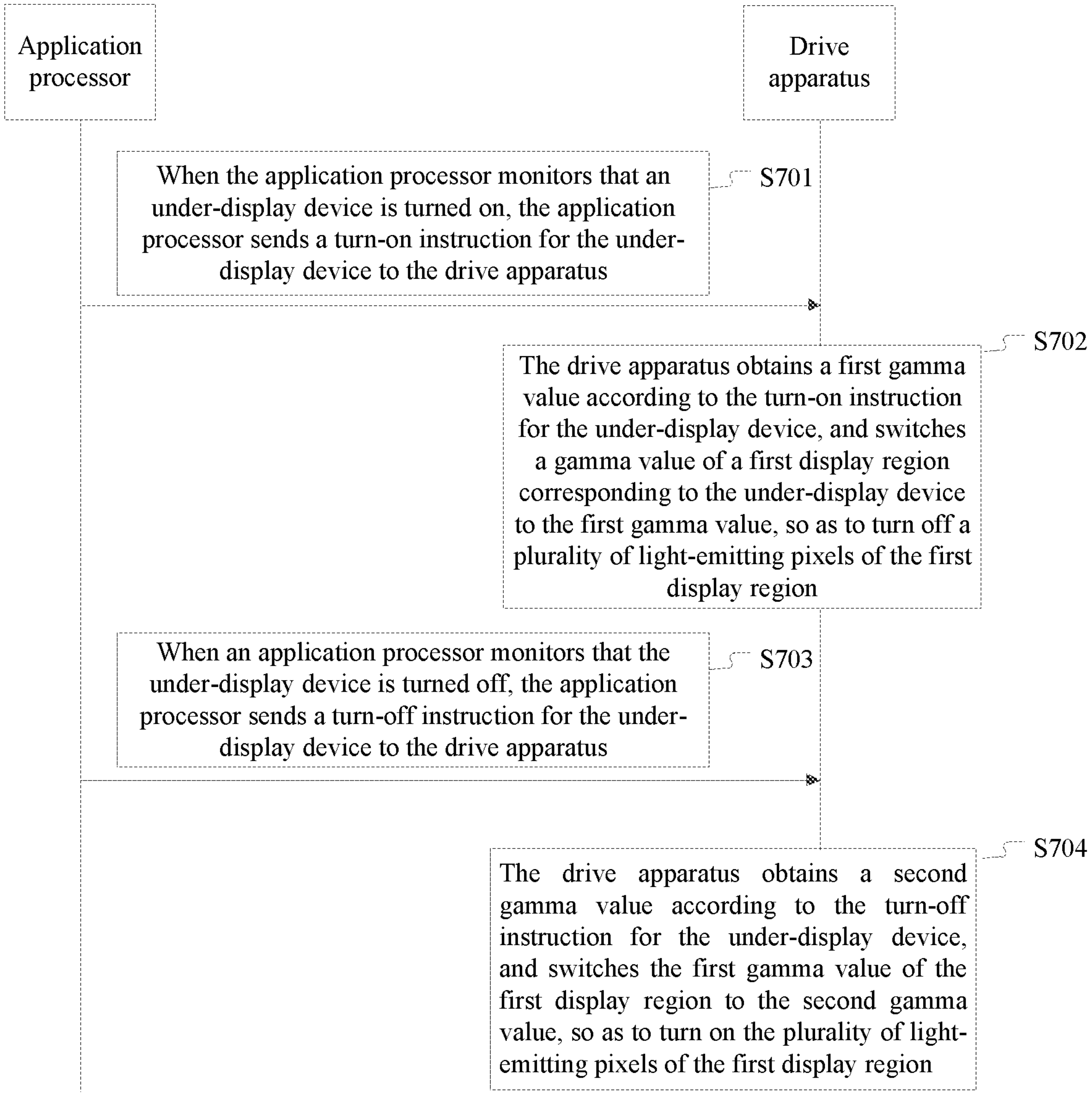
FIG. 7 is a schematic flowchart of still another display screen controlling method provided by an embodiment of the present application.

In addition, the embodiment of the present application also provides another display screen controlling method, which is described in terms of the interaction between an application processor and a drive apparatus, as shown in FIG. 7, the method may include: S701: when the application processor monitors that an under-display device is turned on, the application processor sends a turn-on instruction for the under-display device to the drive apparatus; and

S702: the drive apparatus obtains a first gamma value according to the turn-on instruction for the under-display device, and switches a gamma value of a first display region corresponding to the under-display device to the first gamma value, so as to turn off a plurality of light-emitting pixels of the first display region.

In a possible implementation, where the obtaining the first gamma value according to the above-mentioned turn-on instruction for the under-display device includes:

obtaining a pre-stored corresponding relationship between an instruction for the under-display device and a gamma value; and obtaining the first gamma value corresponding to the turn-on instruction for the under-display device according to the corresponding relationship.

In addition, where the switching a gamma value of a first display region corresponding to the under-display device to the first gamma value includes:

detecting whether the gamma value of the first display region is the same as the first gamma value;

if the gamma value of the first display region is different from the first gamma value, switching the gamma value of the first display region to the first gamma value.

S703: when an application processor monitors that the under-display device is turned off, the application processor sends a turn-off instruction for the under-display device to the drive apparatus.

S704: the drive apparatus obtains a second gamma value according to the turn-off instruction for the under-display device, and switches the first gamma value of the first display region to the second gamma value, so as to turn on the plurality of light-emitting pixels of the first display region.

Exemplarily, where the obtaining a second gamma value according to a turn-off instruction for the under-display device includes:

obtaining the second gamma value corresponding to the turn-off instruction for the under-display device according to the corresponding relationship.

In the embodiment of the present application, the drive apparatus receives the turn-on instruction for the under-display device or the turn-off instruction for the under-display device sent by an application processor, and then adjusts the Gamma parameter of the first display region corresponding to the under-display device according to these instructions, when the under-display device is turned on, the plurality of light-emitting pixels of the above region are turned off to realize the transparent effect of the above region, so that the under-display device can operate normally, thus solving the problem of cumbersome operations occurred when turning on or turning off a certain display screen region currently by writing different data in the existing art, thereby meeting needs of practical applications.

Figure 8:
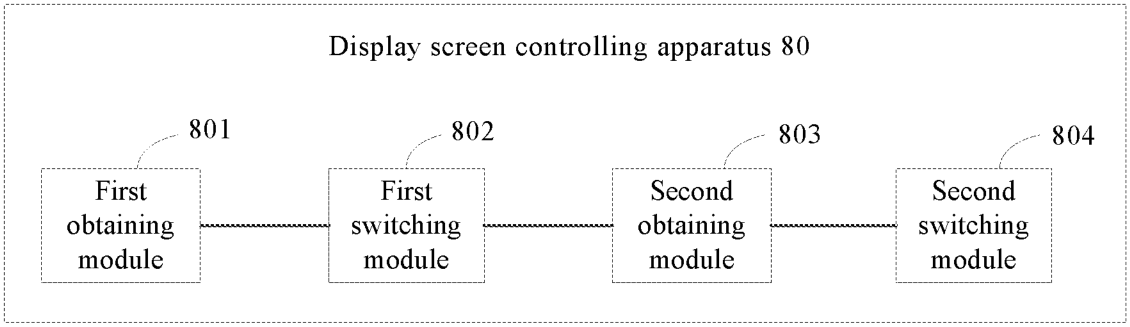
FIG. 8 is a schematic structural diagram of a display screen controlling apparatus provided by an embodiment of the present application.

Corresponding to the display screen controlling method in the above embodiments, FIG. 8 is a schematic structural diagram of a display screen controlling apparatus provided by an embodiment of the present application. For the convenience of description, only the parts related to the embodiments of the present application are shown. FIG. 8 is a schematic structural diagram of a display screen controlling apparatus provided by an embodiment of the present application, the display screen controlling apparatus 80 includes: a first obtaining module 801, a first switch module 802, a second obtaining module 803, and a second switch module 804. The display screen controlling apparatus here may be the above-mentioned drive apparatus per se, or a chip or an integrated circuit that realizes the function of the drive apparatus. It should be noted here that the division of the first obtaining module, the first switching module, the second obtaining module and the second switching module is only a logical function division, and the two of them may be physically integrated or independent. In an implementation, the first obtaining module may be a first obtaining circuit, the first switching module may be a first switching circuit, the second obtaining module may be a second obtaining circuit, and the second switching module may be a second switching circuit.

Where the first obtaining module 801 is configured to obtain a first gamma value according to a turn-on instruction for the under-display device sent by an application processor.

The first switching module 802 is configured to switch a gamma value of a first display region corresponding to the under-display device to the first gamma value, so as to turn off a plurality of light-emitting pixels of the first display region.

The second obtaining module 803 is configured to obtain a second gamma value according to a turn-off instruction for the under-display device sent by the application processor.

The second switching module 804 is configured to switch the first gamma value of the first display region to the second gamma value, so as to turn on the plurality of light-emitting pixels of the first display region.

In a possible implementation, the first obtaining module 801 is specifically configured to:

obtain a pre-stored corresponding relationship between an instruction for the under-display device and a gamma value; and obtain the first gamma value corresponding to the turn-on instruction for the under-display device according to the corresponding relationship.

In a possible implementation, the first switching module 802 specifically configured to:

detect whether the gamma value of the first display region is the same as the first gamma value; and if the gamma value of the first display region is different from the first gamma value, switch the gamma value of the first display region to the first gamma value.

In a possible implementation, the first gamma value is determined according to a voltage required to turn off the plurality of light-emitting pixels of the first display region, and the second gamma value is determined according to a voltage required to turn on the plurality of light-emitting pixels of the first display region.

The apparatus provided in the embodiment of the present application can be configured to implement the technical solutions of the foregoing method embodiment, and the implementation principles and technical effects thereof are similar, which will not be described again in the embodiment of the present application.

Figure 9:
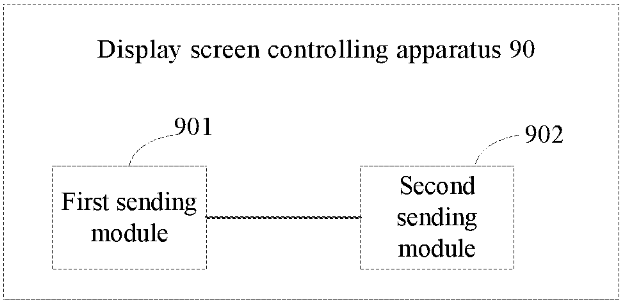
FIG. 9 is a schematic structural diagram of another display screen controlling apparatus provided by an embodiment of the present application.

FIG. 9 is a schematic structural diagram of another display screen controlling apparatus provided by an embodiment of the present application. As shown in FIG. 9, the display screen controlling apparatus 90 includes: a first sending module 901 and a second sending module 902. The display screen controlling apparatus here may be the above-mentioned application processor per se, or a chip or an integrated circuit that realizes the function of the application processor. It should be noted here that the division of the first sending module and the second sending module is only a logical function division, and the two may be physically integrated or independent. In an implementation, the first sending module may be a first sending circuit, and the second sending module may be a second sending circuit.

Where the first sending module 901 is configured to send a turn-on instruction for an under-display device to a drive apparatus when the display screen controlling apparatus monitors that the under-display device is turned on, where the turn-on instruction for the under-display device is used to instruct the drive apparatus to obtain a first gamma value and switch a gamma value of a first display region corresponding to the under-display device to the first gamma value, so as to turn off a plurality of light-emitting pixels of the first display region.

The second sending module 902 is configured to send a turn-off instruction for the under-display device to the drive apparatus when the display screen controlling apparatus monitors that the under-display device is turned off, where the turn-off instruction for the under-display device is used to instruct the drive apparatus to obtain a second gamma value and switch the first gamma value of the first display region to the second gamma value, so as to turn on the plurality of light-emitting pixels of the first display region.

The apparatus provided in the embodiment of the present application can be configured to implement the technical solutions of the foregoing method embodiment, and the implementation principles and technical effects thereof are similar, which will not be described again in the embodiment of the present application.

Figure 10A:
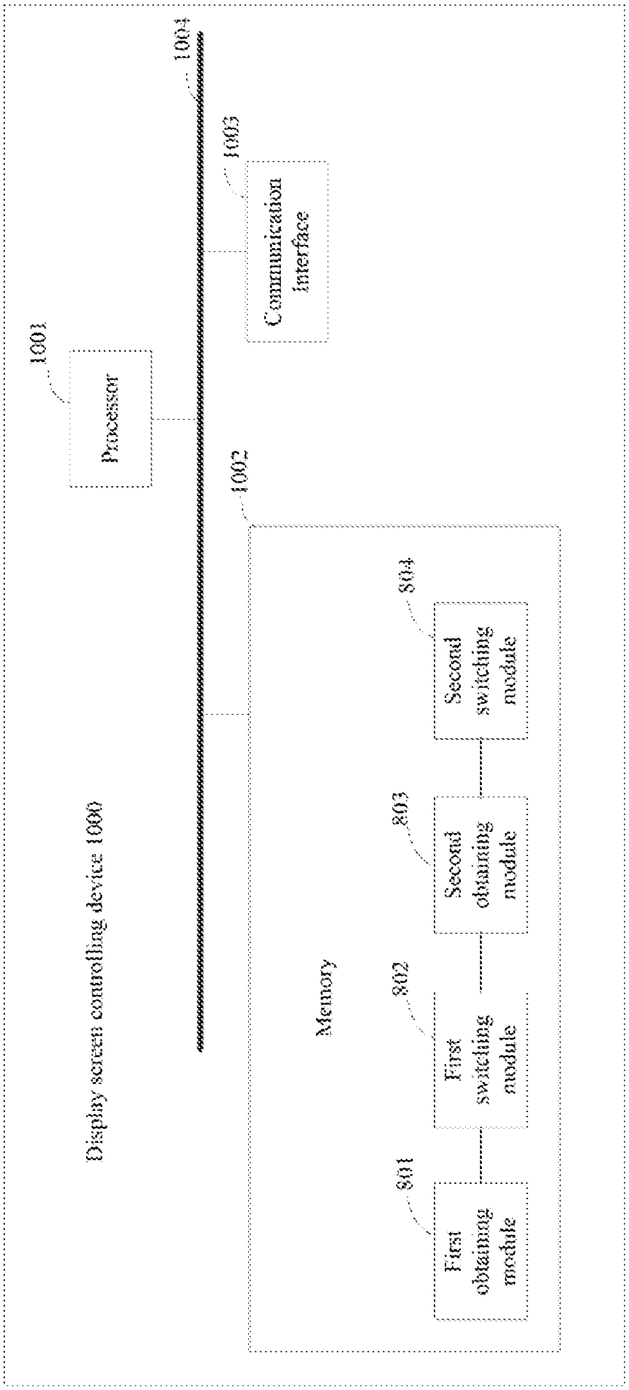
FIG. 10A is a schematic diagram of a basic hardware architecture of a display screen controlling device provided by the application.
Figure 10B:
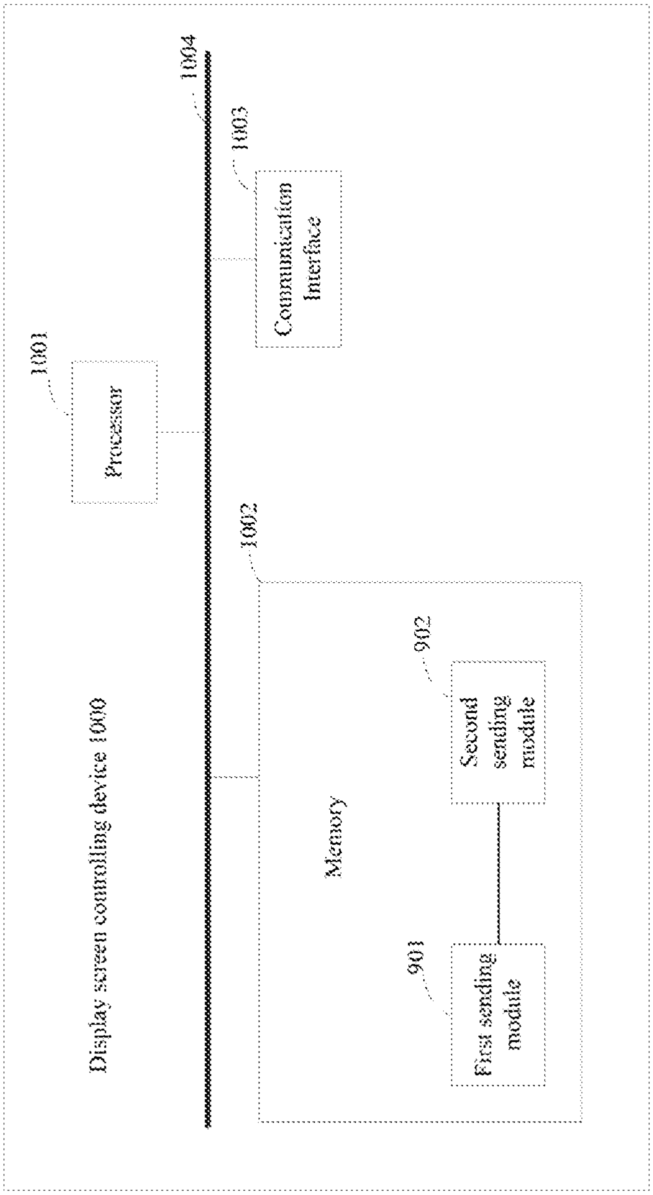
FIG. 10B is a schematic diagram of a basic hardware architecture of another display screen controlling device provided by the present application.

In an implementation, FIGS. 10A and 10B schematically provide a possible basic hardware architecture of the display screen controlling apparatus described in the present application.

Referring to FIGS. 10A and 10B, the display screen controlling device 1000 includes at least one processor 1001 and a communication interface 1003. Further In an implementation, a memory 1002 and a bus 1004 may also be included.

The display screen controlling device 1000 may be a computer or a server, which is not particularly limited in the present application. In the display screen controlling device 1000, the number of processors 1001 may be one or more, and FIGS. 10A and 10B only illustrate one processor 1001. In an implementation, the processor 1001 may be a central processing unit (central processing unit, CPU), a graphics processing unit (graphics processing unit, GPU), or a digital signal processor (digital signal processor, DSP). If the display screen controlling device 1000 has a plurality of processors 1001, the types of the plurality of processors 1001 may be different, or may be the same. In an implementation, the plurality of processors 1001 of the display screen controlling device 1000 may also be integrated into a multi-core processor.

The memory 1002 stores computer instructions and data; the memory 1002 can store computer instructions and data required to implement the above-mentioned display screen controlling method provided by the present application, for example, the memory 1002 stores instructions for implementing the steps of the above-mentioned display screen controlling method. The memory 1002 may be any one or any combination of the following storage mediums: a non-volatile memory (e.g., a read only memory (ROM), a solid state disk (SSD), a hard disk (HDD), an optical disk), a volatile memory.

The communication interface 1003 may provide information input/output for the at least one processor. It can also include any one or any combination of the following devices: a network interface (such as an Ethernet interface), a wireless network card, and other devices with network access functions.

In an implementation, the communication interface 1003 may also be used for data communication between the display screen controlling device 1000 and other computing devices or terminals.

Further In an implementation, FIGS. 10A and 10B represent the bus 1004 with a thick line. The bus 1004 may connect the processor 1001 with the memory 1002 and the communication interface 1003. In this way, through the bus 1004, the processor 1001 can access the memory 1002, and can also use the communication interface 1003 to perform data interaction with other computing devices or terminals.

In the present application, the display screen controlling device 1000 executes the computer instructions in the memory 1002, so that the display screen controlling device 1000 implements the above-mentioned display screen controlling method provided in the present application, or so that the display screen controlling device 1000 deploy the above-mentioned display screen controlling device.

From the perspective of logical function division, exemplarily, as shown in FIG. 10A, the memory 1002 may include a first obtaining module 801, a first switching module 802, a second obtaining module 803 and a second switching module 804. The inclusion here only involves that the functions of the obtaining module and the switching module can be implemented respectively when the instructions stored in the memory are executed, rather than limiting physical structures.

Where the first obtaining module 801 is configured to obtain a first gamma value according to a turn-on instruction for an under-display device sent by an application processor.

The first switching module 802 is configured to switch a gamma value of a first display region corresponding to the under-display device to the first gamma value, so as to turn off a plurality of light-emitting pixels of the first display region.

The second obtaining module 803 is configured to obtain a second gamma value according to the turn-off instruction for the under-display device sent by the application processor.

The second switching module 804 is configured to switch the first gamma value of the first display region to the second gamma value, so as to turn on the plurality of light-emitting pixels of the first display region.

In a possible implementation, the first obtaining module 801 is specifically configured to:

obtain the pre-stored corresponding relationship between an instruction for the under-display device and a gamma value; and obtain the first gamma value corresponding to the turn-on instruction for the under-display device according to the corresponding relationship.

In a possible implementation, the first switching module 802 is specifically configured to:

detect whether the gamma value of the first display region is the same as the first gamma value; and if the gamma value of the first display region is different from the first gamma value, switch the gamma value of the first display region to the first gamma value.

In a possible implementation, the first gamma value is determined according to a voltage required to turn off the plurality of light-emitting pixels of the first display region, and the second gamma value is determined according to a voltage required to turn on the plurality of light-emitting pixels of the first display region.

In a possible design, as shown in FIG. 10B, the memory 1002 may include a first sending module 901 and a second sending module 902. The inclusion here only involves that the functions of the sending module can be implemented respectively when the instructions stored in the memory are executed, rather than limiting physical structures.

Where the first sending module 901 is configured to send a turn-on instruction for an under-display device to a drive apparatus when the display screen controlling apparatus monitors that the under-display device is turned on, where the turn-on instruction for the under-display device is configured to instruct the drive apparatus to obtain a first gamma value and switch a gamma value of a first display region corresponding to the under-display device to the first gamma value, so as to turn off a plurality of light-emitting pixels of the first display region.

The second sending module 902 is configured to send a turn-off instruction for the under-display device to the drive apparatus when the display screen controlling apparatus monitors that the under-display device is turned off, where the turn-off instruction for the under-display device is configured to instruct the drive apparatus to obtain a second gamma value and switch the first gamma value of the first display region to the second gamma value, so as to turn on the plurality of light-emitting pixels of the first display region.

In addition, the above-mentioned display screen controlling apparatus can be implemented as a hardware module, or as a circuit unit, in addition to being implemented by software as in the above-mentioned FIGS. 10A and 10B.

The present application provides a computer-readable storage medium, and the computer-readable storage medium includes computer instructions, and the computer instructions instruct a computing device to execute the above-mentioned display screen controlling method provided by the present application.

The present application provides a computer program product, and the computer program product includes computer instructions, and the computer instructions are used to cause a computer to execute the above-mentioned display screen controlling method.

The present application provides a chip including at least one processor and a communication interface, and the communication interface provides information input and/or output for the at least one processor. Further, the chip may also include at least one memory for storing computer instructions. The at least one processor is configured to invoke and execute the computer instructions to execute the above-mentioned display screen controlling method provided by the present application.

In the several embodiments provided in the present application, it should be understood that the disclosed apparatuses and methods may be implemented in other ways. For example, the apparatus embodiments described above are only illustrative, for example, the division of the units is only a logical function division, in actual implementations, there may be other division manners, for example, multiple units or assembles may be combined or can be integrated into another system, or some features can be ignored, or not being implemented. On the other hand, the shown or discussed mutual coupling or direct coupling or communication connection may be indirect coupling or communication connection through some interfaces, apparatus or units, and may be in electrical, mechanical, or other forms.

In addition, each functional unit in each embodiment of the present application may be integrated into one processing unit, or each of the units may exist separately physically, or two or more units may be integrated into one unit. The above-mentioned integrated unit may be implemented in the form of hardware, or may be implemented in the form of hardware plus software functional units.

What is claimed is:

1. A display screen controlling method, comprising:

obtaining a first gamma value according to a turn-on instruction for an under-display device sent by an application processor;

comparing a gamma value of a first display region to the first gamma value; and switching the gamma value of the first display region corresponding to the under-display device to the first gamma value when the gamma value of the first display region is different from the first gamma value, so as to turn off a plurality of light-emitting pixels of the first display region;

obtaining a second gamma value according to a turn-off instruction for the under-display device sent by the application processor, wherein the second gamma value is a gamma value of a second display screen region and different from the first gamma value; and switching the first gamma value of the first display region to the second gamma value, so as to turn on the plurality of light-emitting pixels of the first display region.

2. The display screen controlling method according to claim 1, wherein obtaining the first gamma value according to the turn-on instruction for the under-display device sent by the application processor further comprises:

obtaining a pre-stored corresponding relationship between an instruction for the under-display device and a gamma value; and obtaining the first gamma value corresponding to the turn-on instruction for the under-display device according to the corresponding relationship.

3. The display screen controlling method according to claim 2, further comprising:

determining the first gamma value according to a voltage required to turn off the plurality of light-emitting pixels of the first display region; and determining the second gamma value according to a voltage required to turn on the plurality of light-emitting pixels of the first display region.

4. The display screen controlling method according to claim 1, further comprising:

determining the first gamma value according to a voltage required to turn off the plurality of light-emitting pixels of the first display region; and determining the second gamma value according to a voltage required to turn on the plurality of light-emitting pixels of the first display region.

5. A display screen controlling method, comprising:

when an application processor monitors that an under-display device is turned on, the application processor sends a turn-on instruction for the under-display device to a drive apparatus;

obtaining, by the drive apparatus, a first gamma value according to the turn-on instruction for the under-display device;

comparing a gamma value of a first display region to the first gamma value; and switching, by the drive apparatus, the gamma value of the first display region corresponding to the under-display device to the first gamma value when the gamma value of the first display region is different from the first gamma value, so as to turn off a plurality of light-emitting pixels of the first display region;

when the application processor monitors that the under-display device is turned off, the application processor sends a turn-off instruction for the under-display device to the drive apparatus; and obtaining, by the drive apparatus, a second gamma value according to the turn-off instruction for the under-display device, wherein the second gamma value is a gamma value of a second display screen region and different from the first gamma value; and switching, by the drive apparatus, the first gamma value of the first display region to the second gamma value, so as to turn on the plurality of light-emitting pixels of the first display region.

6. The display screen controlling method according to claim 5, wherein obtaining, by the drive apparatus, the first gamma value according to the turn-on instruction for the under-display device further comprises:

obtaining a pre-stored corresponding relationship between an instruction for the under-display device and a gamma value; and obtaining the first gamma value corresponding to the turn-on instruction for the under-display device according to the corresponding relationship.

7. The display screen controlling method according to claim 5, further comprising:

determining the first gamma value according to a voltage required to turn off the plurality of light-emitting pixels of the first display region; and determining the second gamma value according to a voltage required to turn on the plurality of light-emitting pixels of the first display region.

8. A display screen controlling apparatus, comprising:

a first obtaining module configured to obtain a first gamma value according to a turn-on instruction for an under-display device sent by an application processor and compare a gamma value of a first display region to the first gamma value;

a first switching module configured to switch the gamma value of the first display region corresponding to the under-display device to the first gamma value when the gamma value of the first display region is different from the first gamma value, so as to turn off a plurality of light-emitting pixels of the first display region;

a second obtaining module configured to obtain a second gamma value according to a turn-off instruction for the under-display device sent by the application processor, wherein the second gamma value is a gamma value of a second display screen region and different from the first gamma value; and a second switching module configured to switch the first gamma value of the first display region to the second gamma value, so as to turn on the plurality of light-emitting pixels of the first display region.

9. The display screen controlling apparatus according to claim 8, wherein the first obtaining module is further configured to:

obtain a pre-stored corresponding relationship between an instruction for the under-display device and a gamma value; and obtain the first gamma value corresponding to the turn-on instruction for the under-display device according to the corresponding relationship.

* * * * *